US006961572B2

(12) United States Patent  (10) Patent No.: US 6,961,572 B2
Needham et al.  (45) Date of Patent: Nov. 1, 2005

(54) METHOD AND APPARATUS FOR BASE-INITIATED, CDMA-DISPATCH SOFT HANDOFF

(75) Inventors: Michael L. Needham, Palatine, IL (US); Timothy J. Wilson, Rolling Meadows, IL (US); Leigh M. Chinitz, Wellesley, MA (US)

(73) Assignee: Motorola, Inc., Schaumburg, IL (US)

( * ) Notice: Subject to any disclaimer, the term of this patent is extended or adjusted under 35 U.S.C. 154(b) by 557 days.

(21) Appl. No.: 10/027,465

(22) Filed: Dec. 20, 2001

(65) Prior Publication Data

US 2003/0119514 A1 Jun. 26, 2003

(51) Int. Cl.[7] .......................... H04Q 7/20; H04Q 7/00; H04M 1/00
(52) U.S. Cl. ...................... 455/442; 436/438; 436/450; 436/518; 436/553.1; 436/434; 370/331; 370/332
(58) Field of Search ............................. 455/422.1, 425, 455/426.1, 424, 430–436, 442, 466, 500, 455/513, 515, 516–522, 524–526, 561, 416, 455/434, 550.1, 553.1, 450, 456.5, 423, 438, 455/439; 370/310, 327, 320, 331–332, 335, 370/340–342, 441

(56) References Cited

U.S. PATENT DOCUMENTS

| | | | |
|---|---|---|---|
| 5,056,109 A | 10/1991 | Gilhousen et al. | |
| 5,216,692 A | 6/1993 | Ling | |
| 5,257,183 A | 10/1993 | Tam | |
| 5,265,119 A | 11/1993 | Gilhousen | |
| 5,267,262 A | 11/1993 | Wheatley, III | |
| 5,323,452 A | 6/1994 | Dickman et al. | |
| 5,383,219 A | 1/1995 | Wheatley, III et al. | |
| 5,465,391 A * | 11/1995 | Toyryla | 455/518 |
| 5,485,486 A | 1/1996 | Gilhousen et al. | |
| 5,548,808 A | 8/1996 | Bruckert et al. | |
| 5,590,177 A | 12/1996 | Vilmur et al. | |
| 5,613,209 A | 3/1997 | Peterson et al. | |
| 5,621,723 A | 4/1997 | Walton, Jr. et al. | |
| 5,691,979 A | 11/1997 | Cadd et al. | |
| 5,711,011 A | 1/1998 | Urs et al. | |
| 5,794,149 A * | 8/1998 | Hoo | 455/438 |
| 5,797,097 A | 8/1998 | Roach, Jr. et al. | |
| 5,797,100 A * | 8/1998 | Dettner | 455/518 |
| 5,850,611 A * | 12/1998 | Krebs | 455/518 |
| 5,852,781 A | 12/1998 | Ahvenainen | |
| 5,878,038 A | 3/1999 | Willey | |
| 5,881,058 A | 3/1999 | Chen | |
| 5,881,368 A | 3/1999 | Grob et al. | |
| 5,887,252 A | 3/1999 | Noneman | |

(Continued)

FOREIGN PATENT DOCUMENTS

EP   0 828 355 A2   3/1998

(Continued)

*Primary Examiner*—William Trost
*Assistant Examiner*—Meless Zewdu
(74) *Attorney, Agent, or Firm*—Jeffrey K. Jacobs

(57) ABSTRACT

To address the need for an apparatus and method for CDMA-dispatch soft handoff, the present invention enables base-initiated soft handoff for dispatch calls. A mobile station (120) in a dispatch call establishes an individual inbound link (137) with the serving base site (111). The serving base site and one or more adjacent base sites (e.g., 110 and 112) determine the signal quality of the inbound link transmissions of the mobile station. The adjacent base site with the highest received inbound link signal quality is selected as the target soft handoff site. The serving base site then transmits the handoff information to enable the mobile station to begin a soft handoff with the target site.

18 Claims, 2 Drawing Sheets

U.S. PATENT DOCUMENTS

| | | | |
|---|---|---|---|
| 5,914,958 A | * 6/1999 | Chinitz et al. | 370/441 |
| 5,920,549 A | 7/1999 | Bruckert et al. | |
| 5,960,356 A | 9/1999 | Alperovich et al. | |
| 5,970,417 A | * 10/1999 | Toyryla et al. | 455/519 |
| 5,983,099 A | * 11/1999 | Yao et al. | 455/426.1 |
| 5,987,012 A | 11/1999 | Bruckert et al. | |
| 6,005,848 A | 12/1999 | Grube et al. | |
| 6,058,308 A | 5/2000 | Kallin et al. | |
| 6,115,388 A | * 9/2000 | Chinitz et al. | 370/441 |
| 6,169,906 B1 | 1/2001 | Bruckert | |
| 6,178,166 B1 | 1/2001 | Wilson et al. | |
| 6,181,685 B1 | 1/2001 | Chinitz et al. | |
| 6,188,767 B1 | 2/2001 | Needham et al. | |
| 6,233,461 B1 | 5/2001 | Chinitz et al. | |
| 6,321,089 B1 | * 11/2001 | Han | 455/438 |
| 6,333,921 B1 | 12/2001 | Grube et al. | |
| 6,449,491 B1 | * 9/2002 | Dailey | 455/518 |
| 6,594,498 B1 | * 7/2003 | McKenna et al. | 455/517 |
| 6,606,496 B1 | * 8/2003 | Salvarani et al. | 455/436 |
| 2002/0197994 A1 | * 12/2002 | Harris et al. | 455/445 |
| 2003/0117976 A1 | * 6/2003 | Needham et al. | 370/331 |
| 2003/0119513 A1 | * 6/2003 | Needham et al. | 455/442 |

FOREIGN PATENT DOCUMENTS

| | | |
|---|---|---|
| WO | WO 91/07020 A2 | 5/1991 |
| WO | WO 97/47094 A2 | 12/1997 |
| WO | WO 99/22478 A1 | 5/1999 |

\* cited by examiner

METHOD AND APPARATUS FOR BASE-INITIATED, CDMA-DISPATCH SOFT HANDOFF

CROSS-REFERENCE TO RELATED APPLICATION

This application is related to the following co-pending U.S. applications and issued U.S. patents all filed on even date herewith, all assigned to the assignee of the present application, and all hereby incorporated by reference into the present application: U.S. Pat. No. 6,788,941 granted Sep. 7, 2004 entitled "METHOD AND APPARATUS FOR MOBILE-INITIATED, COMA-DISPATCH SOFT HANDOFF," U.S. Ser. No. 10/027,488 entitled "METHOD AND APPARATUS FOR CDMA-DISPATCH SOFT HANDOFF," U.S. Ser. No. 10/027,193 entitled "METHOD AND APPARATUS FOR QUICKLY ESTABLISHING A CDMA DISPATCH CALL," and U.S. Pat. No. 6,801,783 granted Oct. 5, 2004 entitled "BASE SITE AND METHOD FOR QUICKLY ESTABLISHING A CDMA DISPATCH CALL."

FIELD OF THE INVENTION

The present invention relates generally to the field of wireless communications, and more particularly, to code division multiple access (CDMA) communication systems and dispatch group call communication systems.

BACKGROUND OF THE INVENTION

A typical dispatch two-way radio communication system comprises communication units, communication resources, communication sites, and a communication resource allocator. Each of the sites has a substantially distinct coverage area and is geographically located throughout the system. Each site also has a number of communication resources assigned to it, where at least one of the communication resources is used as a control channel, while a number of the remaining communication resources are used as voice channels. Such systems are known to use both frequency division multiplex access (FDMA) and time division multiple access (TDMA) methods to rebroadcast transmissions.

The communication units are typically arranged into communication groups (talkgroups) and may be located anywhere within the system (in any site). When a communication unit of a talkgroup requests a group call, it transmits, via a control channel of the site in which it is located, an inbound signaling message to the communication resource allocator. (A group call typically allows all members of the same talkgroup that are located within the system to communicate with each other.) The inbound signaling message generally comprises the requesting communication unit's individual identification number, the requesting communication unit's talkgroup, and a request for a group call. Upon receiving the inbound signaling message, the communication resource allocator will allocate a voice channel in each site to the requesting communication unit's talkgroup.

Thus, in FDMA and TDMA dispatch systems a forward link is established (one in each site where communication units are present) and monitored by all units involved in the group call in that site, and a single reverse link which is used by the group member who is currently transmitting to the other members. Non-transmitting talkgroup members are typically in a listen only mode (i.e., not able to transmit when another member is talking) and thus are not allocated a dedicated reverse link. In a TDMA system, for example, time slots are allocated to different users. A talkgroup member transmitting on an assigned reverse link, is allowed to use full power transmission to support short bursts of signals in allocated time slots. Despite the discontinuous or discrete nature of this approach, the listener receives what appears a continuous service.

In the last decade, in response to an ever-accelerating worldwide demand for mobile and personal portable communications, spread spectrum digital technology, of which one type is known as CDMA, has achieved much higher bandwidth efficiency for a given wireless spectrum allocation, and hence has proved to be an excellent alternative for serving large populations of multiple access users, than analog or other digital technologies. CDMA relies on processing power to extract a coded signal embedded across a broad frequency spectrum. The only way to extract the wanted signal from among many other overlaid unwanted signals is to have the right code. The use of coding allows more channels to be derived by the overlaying of carriers one over another and greatly enhances performance in terms of derived channels per hertz of bandwidth.

CDMA is well suited for cellular communications, but has never been employed in a conventional dispatch system. Unlike conventional dispatch systems, CDMA systems require soft handoff at cell (site) boundaries. During a soft handoff, a communication unit, or mobile station (MS), receives the call transmission from multiple cells simultaneously until it completes the soft handoff. Employing CDMA in a conventional dispatch system requires a solution to the problem of providing soft handoff for multiple MSs that are participating in the dispatch call. Therefore, a need exists for an apparatus and method for CDMA-dispatch soft handoff.

DESCRIPTION OF A PREFERRED EMBODIMENT

To address the need for an apparatus and method for CDMA-dispatch soft handoff, the present invention enables base-initiated soft handoff for dispatch calls. A mobile station in a dispatch call establishes an individual inbound link with the serving base site. The serving base site and one or more adjacent base sites determine the signal quality of the inbound link transmissions of the mobile station. The adjacent base site with the highest received inbound link signal quality is selected as the target soft handoff site. The serving base site then transmits the handoff information to enable the mobile station to begin a soft handoff with the target site.

Figure 1:
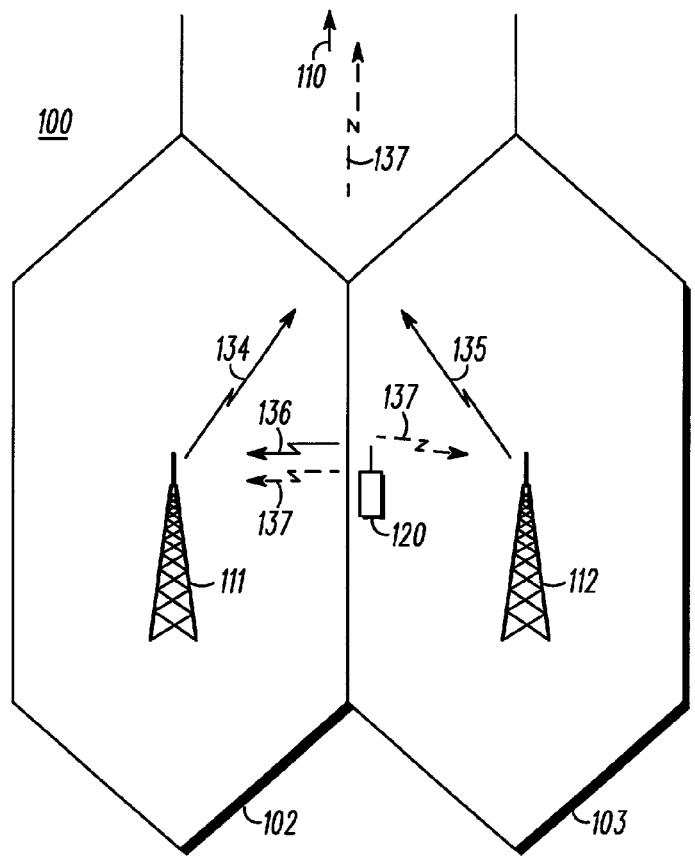
FIG. 1 is a block diagram depiction of a communication system in accordance with a preferred embodiment of the present invention.
Figure 2:
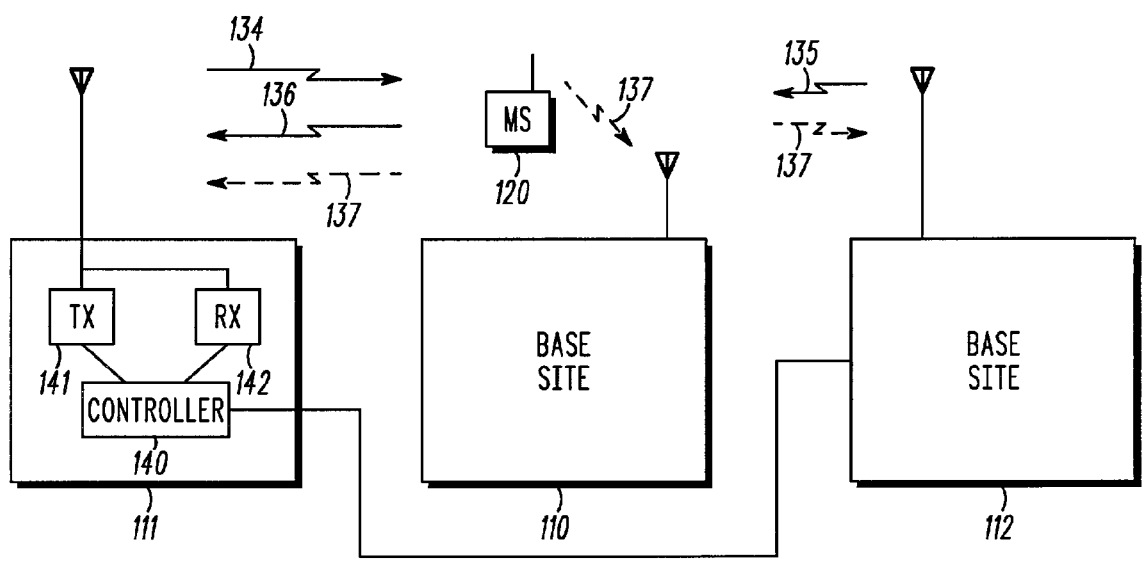
FIG. 2 is a block diagram depiction of base sites and a mobile station (MS) from the communication system of FIG. 1 in accordance with a preferred embodiment of the present invention.
Figure 3:
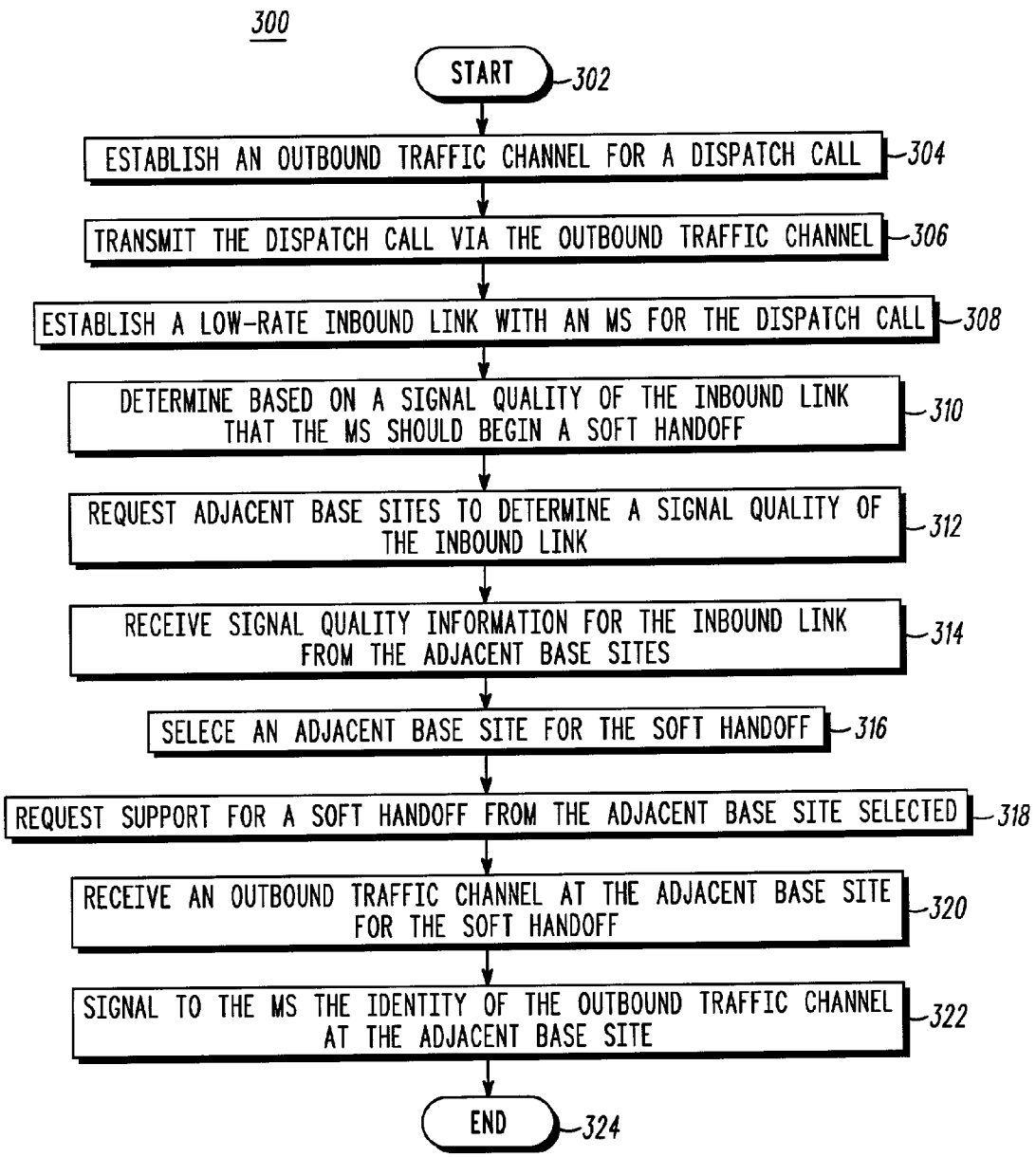
FIG. 3 is a logic flow diagram of steps executed by a base site in accordance with a preferred embodiment of the present invention.

The present invention can be more fully understood with reference to FIGS. 1–3, wherein like numerals designate like components. FIG. 1 is a block diagram depiction of communication system 100 in accordance with a preferred embodiment of the present invention. The wireless communication system 100 is a suitably modified CDMA system, such as a Wideband Spread Spectrum Digital Cellular System in accordance with, for example, the Telecommunications Industry Association/Electronic Industries Association Interim Standard 95 (EIA/TIA IS-95) as known in the art. System 100 comprises a plurality of communication units, although only communication unit 120 is illustrated in FIGS. 1 and 2 for simplicity. In the preferred embodiment, each of the communication units is physically capable of duplex communications, although during typical group communications, only a single communication unit is transmitting at a time.

The fixed infrastructure comprises those elements normally required to support communications within wireless system 100 and, in the preferred embodiment, conforms to a typical CDMA architecture. In particular, the wireless CDMA communication infrastructure comprises well-known components such as base sites 110–112 and their respective service coverage areas 101–103. In practice, the base sites 110–112 typically communicate with each other and with one or more base site controllers, a switch, and additional well-known infrastructure equipment not shown. To illustrate the present invention simply and concisely, the communication infrastructure has been limited to that shown in FIG. 1.

FIG. 2 is a block diagram depiction of base sites 110–112 and mobile station (MS) 120 in accordance with a preferred embodiment of the present invention. (The widely-used, term-of-art, "mobile station," is used interchangeably with "communication unit" throughout this description.) Base site 111 comprises transmitter 141, receiver 142, and controller 140. Base sites in general and base site transmitters, receivers, and controllers in particular are well known in the art. Controller 140 preferably comprises one or more memory devices and processing devices such as a microprocessor and a computer memory. In the preferred embodiment, under the control of software/firmware algorithms stored in the memory devices of base site 111, base site 111 performs those tasks required for well-known base site operation and, additionally, the method described relative to FIG. 3.

CDMA communication channels 134–137 are effectively provided through the use of codes using well-known techniques, e.g., through a combination of orthogonal Walsh codes and pseudorandom noise (PN) sequences. In the preferred embodiment, channels 134–135 comprise full-rate outbound traffic channels transmitted by base sites 111–112, respectively. Preferably, channel 136 is an inbound access channel on which any mobile station (MS) in the system may signal base site 111. Lastly, channel 137 is a low-rate inbound link used by an individual MS to communicate forward power control information, soft handoff information, and/or reverse power information. The use of this link is described at length in U.S. Pat. No. 5,914,958, entitled "FAST CALL SETUP IN A CDMA DISPATCH SYSTEM," and U.S. Pat. No. 6,115,388, entitled "ESTABLISHMENT OF MULTIPLE LOW-RATE INBOUND SIGNALING LINKS IN CDMA DISPATCH SYSTEM," both of which are hereby incorporated by reference.

Operation of a preferred communication system 100 occurs substantially as follows. When a dispatch call is initiated, full-rate CDMA outbound traffic channel 134 is established by base site 111 and used to begin transmitting the dispatch call to MSs 120. Preferably, after beginning to receive the call via channel 134, MS 120 transmits a request to base site 111 via access channel 136 to establish a low-rate inbound link with base site 111. Inbound link 137 is thus established. This low-rate inbound link is established in accord with the description in U.S. Pat. No. 5,914,958 or alternatively with the description in U.S. Pat. No. 6,115,388, both referred to above.

Assume that while receiving the dispatch call, MS 120 is moving toward base site 112. As it moves away from base site 111, MS 120 will be requesting base site 111 to increase the transmit power of channel 134 via inbound link 137. Base site 111 monitors the signal quality of channel 137 and eventually determines that MS 120 should begin a soft handoff. Preferably, base site 111 requests base sites 110 and 112, via an interconnecting infrastructure network, to also determine the signal quality of channel 137 at their respective locations. To enable base sites 110 and 112 to monitor channel 137, base site 111 preferably provides them with MS 120's long code. Receiving the requested signal qualities from base sites 110 and 112, base site 111 preferably selects the base site reporting the strongest signal quality for MS 120 and requests that base site to support a soft handoff of MS 120.

To support the soft handoff, the selected base site (base site 112, e.g.) establishes full-rate CDMA outbound traffic channel 135, begins transmitting the dispatch call in progress, and responds to base site 111 with an indication of channel 135's availability for soft handoff. Base site 111, in turn, communicates to MS 120 the identity and availability of channel 135 for soft handoff to base site 112. Preferably, base site 111 transmits both the CDMA code used for channel 135 and the pseudorandom noise scrambling code offset that base site 112 uses. Together, the code and the offset, identify channel 135 and base site 112 to MS 120. In addition, base site 111 may also indicate the identity of MS 120 as a means to address the indication to MS 120.

To notify MS 120 of channel 135's availability for soft handoff, base site 111 preferably uses in-band signaling on channel 134 to indicate the identity of channel 135 and base site 112. In an alternative embodiment however, base site 111 could instead use a paging channel to convey the information. Specifically, base site 111 could transmit an individual page to MS 120 or a broadcast page that conveys the identity and availability of channel 135 at base site 112. If a broadcast page is used it could also include a talkgroup ID to direct the page to the talkgroup involved in the dispatch call. All the MSs in the dispatch call who are simultaneously scanning the paging channel could thus receive the soft handoff information needed by MS 120. Upon receiving an indication of channel 135's availability, whether by in-band signaling or paging, MS 120 may then begin a soft handoff with base site 112 by simultaneously receiving the dispatch call via channels 134 and 135.

FIG. 3 is a logic flow diagram of steps executed by a base site in accordance with a preferred embodiment of the present invention. Logic flow 300 begins (302) as a dispatch call is being set up by the base site. The base site preferably establishes (304) a full-rate outbound traffic channel on which to transmit (306) the dispatch call to an MS in the base site's coverage area. The base site also establishes (308) a low-rate inbound link for the dispatch call with the MS upon receiving a request from the MS.

The base site monitors the signal quality of its low-rate inbound link with the MS. When the base site determines (310) that the MS needs a soft handoff to maintain the dispatch call, the base site requests (312) adjacent base sites to also determine the signal quality of the inbound link signal as they receive it. After receiving (314) the requested signal quality information from the adjacent base sites, the base site selects (316) as the soft handoff target the adjacent base site that reports the highest signal quality. The base site then requests (318) the soft handoff target site to support a soft handoff of the MS.

Assuming that the target site has the channel resources available to allocate a new outbound traffic channel or that the target site already has a traffic channel conveying the dispatch call, the base site will receive (320) an indication that an outbound traffic channel at the target site is available for soft handoff. The base site then signals (322) the MS preferably indicating the CDMA code that identifies the target site channel and indicating the PN offset that identifies the target base site to enable the MS to begin a soft handoff with the target site. Thus, logic flow 300 ends (324).

While the present invention has been particularly shown and described with reference to particular embodiments thereof, it will be understood by those skilled in the art that various changes in form and details may be made therein without departing from the spirit and scope of the present invention.

What is claimed is:

1. A method for a base site to initiate a CDMA-dispatch soft handoff comprising the steps of:
    establishing a first outbound link for a dispatch call;
    transmitting the dispatch call via the first outbound link;
    establishing an inbound link with a mobile station (MS) for the dispatch call;
    determining based on a signal quality of the in-bound link that the MS should begin a soft handoff;
    determining at least one base site of a plurality of adjacent base sites for the MS to begin a soft handoff with; and
    indicating to the MS an identity of the at least one base site and an identity of an outbound link for the dispatch call at the at least one base site, wherein the step of indicating the identity of the at least one base site and the identity of an outbound link comprises signaling in one of the manners of signaling that are included in the group consisting of signaling in-band on the first outbound link and signaling via a paging channel.

2. The method of claim 1 wherein the step of determining at least one base site comprises the step of requesting at least one base site of a plurality of adjacent base sites to determine a signal quality of the inbound link as received at each of the at least one base sites.

3. The method of claim 2 wherein the step of requesting to determine a signal quality comprises providing the at least one base site of the plurality of adjacent base sites with the long code of the MS.

4. The method of claim 2 wherein the step of determining at least one base site comprises the steps of:
    receiving from at least one base site of the plurality of adjacent base sites an indication of a signal quality of the inbound link; and
    selecting an adjacent base site based on the at least one indication of a signal quality of the inbound link.

5. The method of claim 4 wherein the step of determining at least one base site comprises the steps of:
    requesting support for a soft handoff from the adjacent base site; and
    receiving an indication of a second outbound link at the adjacent base site enabling the soft handoff.

6. The method of claim 1 wherein the inbound link comprises a low-rate inbound link used to communicate at least one of forward power control information and reverse power information.

7. The method of claim 1 wherein the first outbound link comprises a full-rate CDMA outbound traffic channel.

8. The method of claim 1 wherein signaling via a paging channel comprises transmitting a broadcast page to convey the identity of the at least one base site and the identity of an outbound link at the at least one base site.

9. The method of claim 1 wherein the step of indicating to the MS comprises the step of indicating the identity of the MS with the identity of the at least one base site and the identity of an outbound link at the at least one base site.

10. The method of claim 1 wherein the step of indicating to the MS the identity of the at least one base site comprises transmitting to the MS a pseudorandom noise scrambling code offset of the at least one base site base site.

11. The method of claim 1 wherein the step of indicating to the MS the identity of an outbound link at the at least one base site comprises transmitting to the MS a CDMA code used for an outbound link at the at least one base site.

12. A base site comprising:
    a receiver;
    a transmitter; and
    a controller, coupled to the receiver and the transmitter, adapted to establish a first outbound link for a dispatch call, adapted to instruct the transmitter to transmit the dispatch call via the first outbound link, adapted to establish an inbound link with a mobile station (MS) for the dispatch call using the receiver, adapted to determine based on a signal quality of the inbound link that the MS should begin a soft handoff, adapted to determine at least one base site of a plurality of adjacent base sites for the MS to begin a soft handoff with, and adapted to indicate to the MS using the transmitter an identity of the at least one base site and an identity of an outbound link for the dispatch call at the at least one base site, wherein the controller instructs the transmitter to transmit signaling to indicate the identity of the at least one base site and the identity of an outbound link in one of the manners of signaling that are included in the group consisting of signaling in-band on the first outbound link and signaling via a paging channel.

13. The base site of claim 12 wherein the controller is further adapted to request at least one base site of a plurality of adjacent base sites to determine a signal quality of the inbound link as received at each of the at least one base sites.

14. The base site of claim 13 wherein the controller is further adapted to receive from at least one base site of the plurality of adjacent base sites an indication of a signal quality of the inbound link and to select an adjacent base site based on the at least one indication of a signal quality of the inbound link.

15. The base site of claim 14 wherein the controller is further adapted to request support for a soft handoff from the adjacent base site and to receive an indication of a second outbound link at the adjacent base site enabling the soft handoff.

16. The base site of claim 12 wherein the inbound link comprises a low-rate inbound link used to communicate at least one of forward power control information and reverse power information.

17. The base site of claim 12 wherein the first outbound link comprises a full-rate CDMA outbound traffic channel.

18. The base site of claim 12 wherein the controller instructs the transmitter to transmit a broadcast page via the paging channel to convey the identity of the at least one base site and the identity of an outbound link at the at least one base site.

* * * * *